(No Model.)

F. H. PEACOCK.
VEHICLE SPINDLE.

No. 595,863. Patented Dec. 21, 1897.

Witnesses:
Wm. H. Edwards Jr.
Mary McLean

Inventor
F. H. Peacock.
By
R. S. & A. B. Lacey, Attys.

UNITED STATES PATENT OFFICE.

FRANCIS HENRY PEACOCK, OF CLINTONVILLE, ALABAMA.

VEHICLE-SPINDLE.

SPECIFICATION forming part of Letters Patent No. 595,863, dated December 21, 1897.

Application filed May 6, 1897. Serial No. 635,393. (No model.)

*To all whom it may concern:*

Be it known that I, FRANCIS HENRY PEACOCK, a citizen of the United States, residing at Clintonville, in the county of Coffee and State of Alabama, have invented certain new and useful Improvements in Vehicle-Spindles; and I do hereby declare the following to be a full, clear, and exact description of the invention, such as will enable others skilled in the art to which it appertains to make and use the same.

My invention relates to improvements in vehicle-axles; and the object of the invention is to provide an axle with an adjustable removable sleeve to encompass the spindle and take up the wear which would otherwise affect the axle.

To this end the novelty consists in the construction, combination, and arrangement of the same, as will be hereinafter more fully described, and particularly pointed out in the claims.

In the accompanying drawings the same reference-characters indicate the same parts of the invention.

Figure 1:
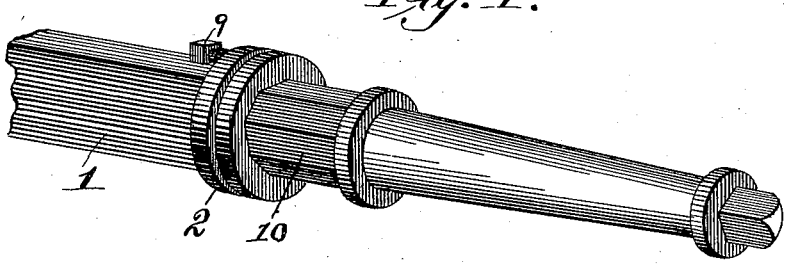
Figure 2:
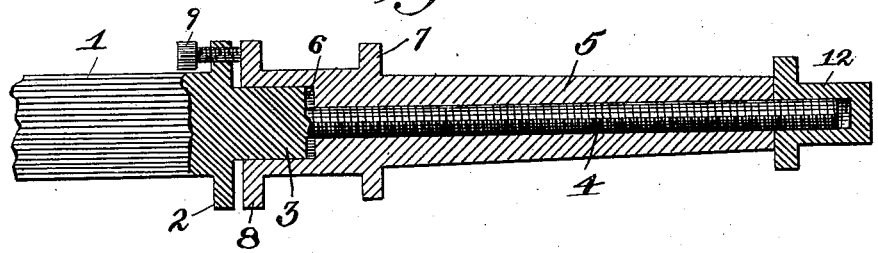
Figure 3:
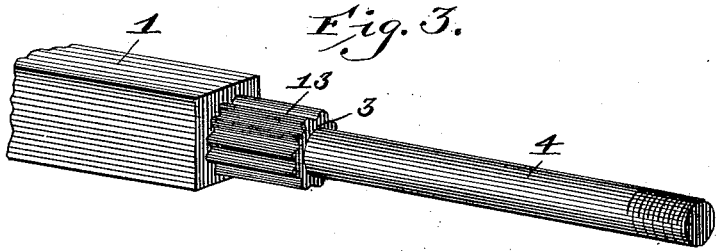
Figure 4:
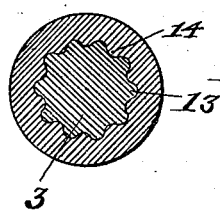

Figure 1 is a perspective view of my improved axle. Fig. 2 is a longitudinal section of the same. Fig. 3 is a modification, and Fig. 4 is a transverse section on the broken line 4 4 of the modification.

1 represents the rectangular axle, formed with the integral collar 2, the cylindrical longitudinal boss 3, and the threaded spindle 4.

5 represents the internally-threaded sleeve snugly encompassing the threaded spindle 4 and formed with the integral socket 6, which also snugly fits the longitudinal boss 3.

7 represents an annular collar on the sleeve, which forms a shoulder-bearing for the thimble in the hub. (Not shown.) 8 represents a similar collar on the inner end of the socket 6, which forms a shoulder for the corresponding collar 2 on the axle, and 9 represents a screw-stud extending longitudinally through the collar 2, with its outer end abutting against the contiguous face of the collar 8, and by varying the adjustment of this stud the position of the sleeve on the spindle will be varied when it is screwed home. The outer face 10 of the socket 6 is polygonal-shaped to receive a wrench for the purpose of rigidly securing it in place on the spindle.

12 represents the flanged nut adjustably secured in place on the outer end of the spindle, and in addition to retaining the hub in place has a double function as a lock jam-nut to secure the sleeve on the spindle.

In the modification I have shown the cylindrical boss 3, formed with longitudinal parallel serrations or grooves 13, and the socket 6, provided with a corresponding series of serrations 14, which permit the position of the sleeve on the spindle to be changed at will.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A vehicle-axle comprising the spindle 4, integral cylindrical boss 3, the collar 2, in combination with the sleeve 5, provided with the cylindrical socket 6, with an external polygonal face 10 and integral parallel collars 7 and 8, and the removable nut 12, substantially as shown and described.

2. The rectangular axle 1, provided with the integral collar 2, the integral longitudinal cylindrical boss 3, and the threaded spindle 4, in combination with the internally-threaded sleeve 5 formed with the integral cylindrical socket 6 and the parallel collars 7 and 8, the adjustable screw-stud 9, mounted in said collar 2 and having one end abutting against the contiguous face of the collar 8 on the sleeve, substantially as shown and described.

In testimony whereof I affix my signature in presence of two witnesses.

FRANCIS HENRY PEACOCK.

Witnesses:
JNO. B. RUSHING,
D. C. COLLINS.